US012689237B2

(12) United States Patent
Yoshida et al.

(10) Patent No.: US 12,689,237 B2
(45) Date of Patent: Jul. 21, 2026

(54) ELECTRONIC CIRCUIT, MODULE, AND SYSTEM

(71) Applicant: SEIKO GROUP CORPORATION, Tokyo (JP)

(72) Inventors: Yoshifumi Yoshida, Matsudo (JP); Noboru Kawai, Matsudo (JP)

(73) Assignee: SEIKO GROUP CORPORATION, Tokyo (JP)

( * ) Notice: Subject to any disclaimer, the term of this patent is extended or adjusted under 35 U.S.C. 154(b) by 0 days.

(21) Appl. No.: 18/839,634

(22) PCT Filed: Jan. 4, 2023

(86) PCT No.: PCT/JP2023/000012
§ 371 (c)(1),
(2) Date: Aug. 19, 2024

(87) PCT Pub. No.: WO2023/176097
PCT Pub. Date: Sep. 21, 2023

(65) Prior Publication Data
US 2025/0167597 A1     May 22, 2025

(30) Foreign Application Priority Data

Mar. 14, 2022    (JP) ................................. 2022-039433

(51) Int. Cl.
*H02J 50/20*        (2016.01)
*H04B 1/38*         (2015.01)
(52) U.S. Cl.
CPC ................ *H02J 50/20* (2016.02); *H04B 1/38* (2013.01)
(58) Field of Classification Search
CPC .............. H02J 50/12; H02J 50/20; H04B 1/38
See application file for complete search history.

(56) References Cited

U.S. PATENT DOCUMENTS

| | | | | |
|---|---|---|---|---|
| 6,388,343 | B1 * | 5/2002 | Michigami | ............... G06F 1/26 |
| | | | | 307/112 |
| 2021/0281114 | A1 * | 9/2021 | Yoshida | ................ H02J 50/001 |
| 2021/0281176 | A1 * | 9/2021 | Yoshida | ................ H02M 7/103 |

FOREIGN PATENT DOCUMENTS

| | | |
|---|---|---|
| JP | Y-04-053162 | 12/1992 |
| JP | A-10-240392 | 9/1998 |

(Continued)

OTHER PUBLICATIONS

International Search Report in Application No. PCT/JP2023/000012 dated Mar. 14, 2023 (4 pages).

*Primary Examiner* — Rexford N Barnie
*Assistant Examiner* — Joseph N Inge
(74) *Attorney, Agent, or Firm* — Crowell & Moring LLP

(57)            ABSTRACT

An electronic circuit includes: a load; a load switch that switches a connection state between a power source and the load to any one of a conductive state and a non-conductive state; a first power conversion circuit that outputs first DC power based on first power obtained by a first radio wave received by a first antenna; a second power conversion circuit that outputs second DC power based on second power obtained by a second radio wave received by a second antenna; and a control circuit that has a first input terminal, a second input terminal, and an output terminal of turning the load switch into a conductive state when the first DC power is input to the first input terminal and turning the load switch into a non-conductive state when the second DC power is input to the second input terminal. The load switch is controlled to maintain a conductive state even when the second radio wave is received by the second antenna in a conductive state.

10 Claims, 12 Drawing Sheets

(56)         References Cited

FOREIGN PATENT DOCUMENTS

JP      A-2011-024332        2/2011
JP        2011055603  A  *  3/2011
JP      A-2011-055603        3/2011
JP        2021141677  A  *  9/2021   ......... G07C 9/00174
JP      A-2021-141677        9/2021

* cited by examiner

FIG. 3

ELECTRONIC CIRCUIT, MODULE, AND SYSTEM

RELATED APPLICATIONS

This application is a 371 application of PCT/JP2023/000012 having an international filing date of Jan. 4, 2023, which claims priority to JP2022-039433 filed on Mar. 14, 2022, the entire content of each of which is incorporated herein by reference.

TECHNICAL FIELD

The present invention relates to an electronic circuit, a module, and a system.

BACKGROUND ART

In modern times, small devices in which a power source such as a battery is mounted on a substrate are used in various fields. Examples of such small devices include medical devices used inside the human body and electronic keys disclosed in Patent Document 1. For these small devices, it is desirable to reduce standby power as much as possible and extend the lifespan of the power source by taking into account the period during which they are stored in inventory, the period when they are not in operation, and the like.

CITATION LIST

Patent Document

Patent Document 1: Japanese Unexamined Patent Application, First Publication No. 2011-024332

As an example of a technology that extends the lifespan of the power source, there is a technology that cuts off the power source and the electronic circuit and then connects the power source and the electronic circuit with a switch when the small device starts to be used. However, since the above switch has a mechanical mechanism, the switch may not operate properly. Further, when a waterproof structure such as resin sealing for the small device is required, the above switch requires a member that moves together with the switch and protrudes toward the outside of the waterproof structure. As a result, the waterproof performance of the waterproof structure may be reduced.

Alternatively, as an example of a technology that extends the lifespan of the power source, there is a technology that uses wireless power to transmit power to the small device and uses that power to connect the power source and the electronic circuit as with the electronic key described above. However, this technology may not be able to disconnect the power source and the electronic circuit again after connecting the power source and the electronic circuit. Further, when the small device adopts technology that can cut off the power source and electronic circuit again after connecting the power source and the electronic circuit, the small device may receive unintended radio waves, and the power source and the electronic circuit may be cut off even though the small device is in use.

SUMMARY OF INVENTION

Technical Problem

The present invention has been made in view of the above-described problems and an object thereof is to provide an electronic circuit, a module, and a system capable of preventing a power source and an electronic circuit from being erroneously cut off when a small device is in use.

Solution to Problem

In order to achieve the above object, an electronic circuit according to an aspect of the present invention includes: a load that is driven by power supplied from a power source; a load switch that is connected between the power source and the load and switches a connection state between the power source and the load to any one of a conductive state of supplying power from the power source to the load and a non-conductive state of cutting off power supplied from the power source to the load; a first power conversion circuit that outputs first DC power based on first power obtained by a first radio wave received by a first antenna; a second power conversion circuit that outputs second DC power based on second power obtained by a second radio wave received by a second antenna; and a control circuit that has a first input terminal connected to the first power conversion circuit, a second input terminal connected to the second power conversion circuit, and an output terminal of turning the load switch into a conductive state when the first DC power is input to the first input terminal and turning the load switch into a non-conductive state when the second DC power is input to the second input terminal, wherein the load switch is controlled to maintain a conductive state even when the second antenna receives a second radio wave in a conductive state.

Further, in the electronic circuit according to an aspect of the present invention, the load switch is controlled to maintain a conductive state by cutting off a path from the second antenna to the second input terminal based on an output from the output terminal or an output from the load.

Further, in the electronic circuit according to an aspect of the present invention, the load switch is controlled to maintain a conductive state in such a manner that a cutoff switch provided in the path turns the path into a non-conductive state based on the output from the output terminal or the output from the load.

Further, in the electronic circuit according to an aspect of the present invention, the cutoff switch constitutes a matching circuit provided in the path.

Further, in the electronic circuit according to an aspect of the present invention, the load switch is controlled to maintain a conductive state in such a manner that the output from the output terminal or the output from the load is introduced into a resistor connected to a matching circuit provided in the path to change a matching constant of the matching circuit.

Further, in the electronic circuit according to an aspect of the present invention, at least two load switches are provided, the control circuit is driven by DC power supplied from the power source, and at least one load switch is controlled so that the load switch maintains a conductive state even when a path from the power source to the control circuit is cut off based on an output from the load.

Further, in the electronic circuit according to an aspect of the present invention, at least two load switches are provided, the control circuit is driven by DC power supplied from the power source, and at least one load switch is controlled so that the load switch maintains a conductive state even when a path from the control circuit to the load switch is cut off based on an output from the load.

Further, in the electronic circuit according to an aspect of the present invention, the control circuit is a flip-flop or an ultra-low current consumption weak signal detector.

In order to achieve the above object, a module according to an aspect of the present invention includes: at least one electronic circuit; and a power source that outputs DC power.

Further, in the module according to an aspect of the present invention, the electronic circuit and the power source are accommodated in a casing having a waterproof function.

In order to achieve the above object, a system according to an aspect of the present invention includes: at least one module; and a transmitter that transmits predetermined radio waves to the module.

Advantageous Effects of Invention

According to the present invention, it is possible to provide an electronic circuit, a module, and a system capable of preventing a power source and an electronic circuit from being erroneously cut off when a small device is in use.

BRIEF DESCRIPTION OF DRAWINGS

FIG. 3 is a diagram showing an example of an electronic circuit according to a second embodiment.

DESCRIPTION OF EMBODIMENTS

First Embodiment

Figure 1:
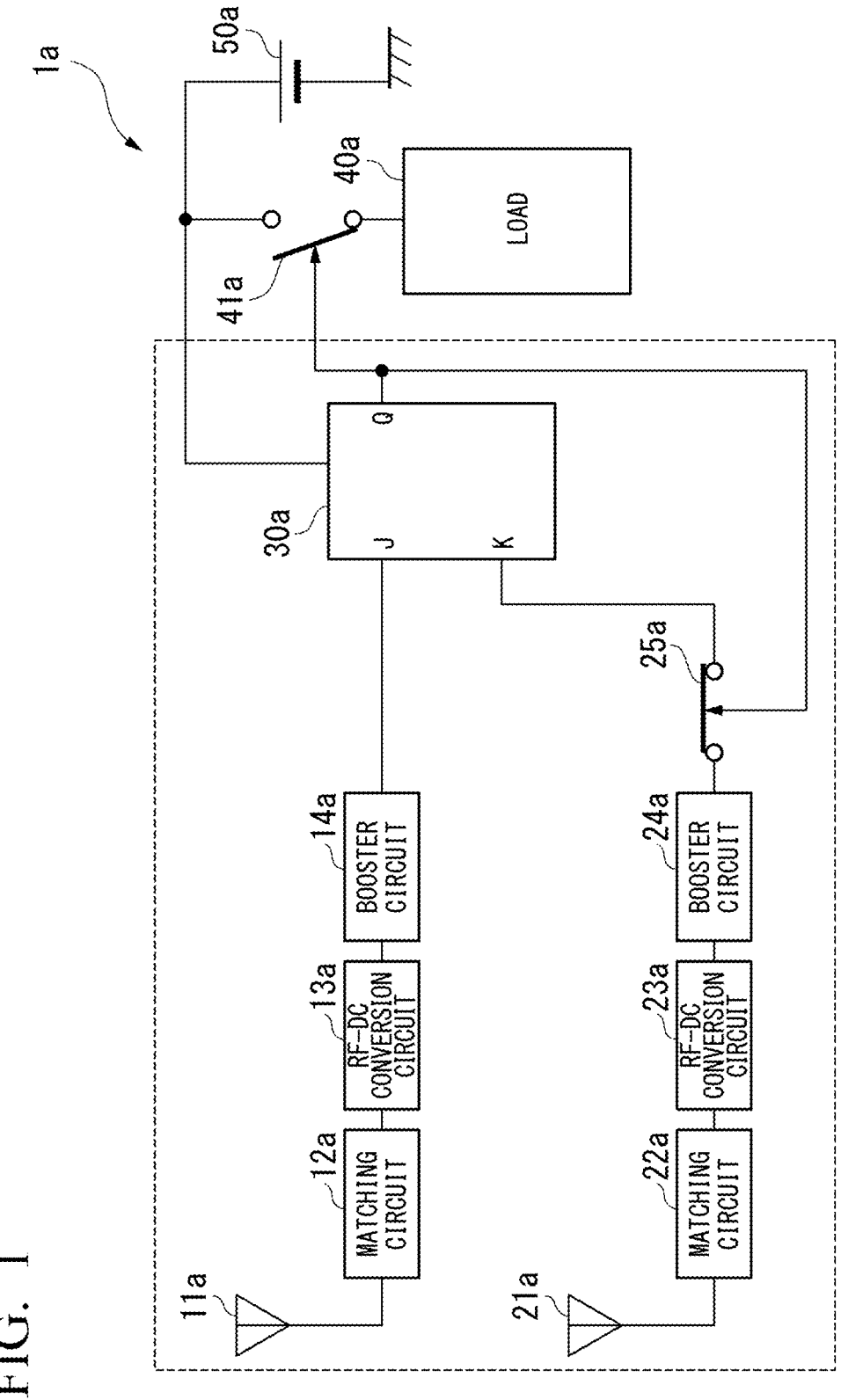
FIG. 1 is a diagram showing an example of an electronic circuit according to a first embodiment.

An electronic circuit according to a first embodiment will be described with reference to FIG. 1. FIG. 1 is a diagram showing an example of an electronic circuit according to the first embodiment. As shown in FIG. 1, an electronic circuit $1a$ includes a first antenna $11a$, a matching circuit $12a$, an RF (Radio Frequency)-DC (Direct Current) conversion circuit $13a$, a booster circuit $14a$, a second antenna $21a$, a matching circuit $22a$, an RF-DC conversion circuit $23a$, a booster circuit $24a$, a cutoff switch $25a$, a control circuit $30a$, a load $40a$, a load switch $41a$, and a power source $50a$.

The first antenna $11a$ receives a first radio wave that is a starting point for turning the load switch $41a$ into a conductive state, and converts the first radio wave into first power. The matching circuit $12a$, the RF-DC conversion circuit $13a$, and the booster circuit $14a$ constitute a first power conversion circuit that outputs first DC power based on the first power. The matching circuit $12a$ realizes impedance matching between the first antenna $11a$ and the RF-DC conversion circuit $13a$. The RF-DC conversion circuit $13a$ converts the AC power output from the matching circuit $12a$ into DC power. The booster circuit $14a$ boosts the DC power output from the RF-DC conversion circuit $13a$ to a desired voltage to generate and output first DC power.

The second antenna $21a$ receives a second radio wave that becomes a starting point for turning the load switch $41a$ into a non-conductive state, and converts the second radio wave into second power. The matching circuit $22a$, the RF-DC conversion circuit $23a$, and the booster circuit $24a$ constitute a second power conversion circuit that outputs second DC power based on the second power. The matching circuit $22a$ realizes impedance matching between the second antenna $21a$ and the RF-DC conversion circuit $23a$. The RF-DC conversion circuit $23a$ converts the AC power output from the matching circuit $22a$ into DC power. The booster circuit $24a$ boosts the DC power output from the RF-DC conversion circuit $23a$ to a desired voltage to generate and output second DC power. The cutoff switch $25a$ is a switch provided in a path from the booster circuit $24a$ to the control circuit $30a$, and is switched from a conductive state to a non-conductive state based on the output from the control circuit $30a$.

Further, it is preferable that measures are taken to prevent the first antenna $11a$ and the second antenna $21a$ from interfering with each other. For example, it is preferable that one of the first antenna $11a$ and the second antenna $21a$ is an electric field detection type antenna and the other is a magnetic field detection type antenna. Alternatively, it is preferable that the first antenna $11a$ and the second antenna $21a$ are installed at different positions. Alternatively, it is preferable that the installed positions of the first antenna $11a$ and the second antenna $21a$ are shifted by 90° from each other. Alternatively, it is preferable that the first antenna $11a$ and the second antenna $21a$ have different frequency directivities.

The control circuit $30a$ is, for example, a JK flip-flop. The control circuit $30a$ operates with power supplied from the power source $50a$. The control circuit $30a$ includes a first input terminal, a second input terminal, and an output terminal. The first input terminal is connected to the booster circuit $14a$, and receives first DC power. The second input terminal is connected to the booster circuit $24a$, and receives second DC power. The output terminal turns the load switch $41a$ into a conductive state when the first DC power is input to the first input terminal. The output terminal turns the load switch $41a$ into a non-conductive state when the second DC power is input to the second input terminal.

Further, the output terminal maintains the current state of the load switch $41a$ when the first DC power input to the first input terminal is extremely weak and is therefore smaller than a predetermined first threshold value and the second DC power input to the second input terminal is extremely weak and is therefore smaller than a predetermined second threshold value. On the other hand, the output terminal inputs first DC power equal to or larger than the predetermined first threshold value to the first input terminal, inputs second DC power equal to or larger than the predetermined second threshold value to the second input terminal, and turns the load switch 41a into a non-conductive state when the load switch 41a is in a conductive state. Further, the output terminal inputs first DC power equal to or larger than the predetermined first threshold value to the first input terminal, inputs second DC power equal to or larger than the predetermined second threshold value to the second input terminal, and turns the load switch 41a into a conductive state when the load switch 41a is in a non-conductive state. Furthermore, examples of cases where the first DC power equal to or larger than the predetermined first threshold value is input to the first input terminal and the second DC power equal to or larger than the predetermined second threshold value is input to the second input terminal are as follows. For example, as such cases, an exemplary case may be one in which radio waves are transmitted from a location sufficiently far away from the first antenna 11a and the second antenna 21a, radio waves that can be regarded as plane waves without any problem are received by the first antenna 11a and the second antenna 21a, the first DC power becomes equal to or larger than the predetermined first threshold value, and the second DC power becomes equal to or larger than the predetermined second threshold value.

The load 40a is a circuit mounted to realize the functions of a device such as a small device equipped with the electronic circuit 1a. When the load switch 41a is in a conductive state, the load 40a operates by receiving power from the power source 50a. On the other hand, when the load switch 41a is in a non-conductive state, the load 40a does not receive power from the power source 50a, and therefore does not operate. The power source 50a is, for example, a battery.

The load switch 41a is controlled to maintain a conductive state even when the second antenna 21a receives a second radio wave while the load switch 41a is in a conductive state. Specifically, the load switch 41a is controlled to maintain a conductive state in such a manner that the cutoff switch 25a provided in the path from the second antenna 21a to the second input terminal is turned into a non-conductive state based on the output from the output terminal. When the cutoff switch 25a is once turned into a non-conductive state based on the output from the output terminal, the cutoff switch cannot be a conductive state again based on the output from the output terminal.

The electronic circuit 1a according to the first embodiment has been described above. The electronic circuit 1a is controlled so that the load switch 41a maintains a conductive state even when the second antenna 21a receives a second radio wave when the load switch 41a is in a conductive state. Accordingly, the electronic circuit 1a can prevent the load 40a from erroneously cutting off the supply of power from the power source 50a even when the second antenna 21a receives a second radio wave when the load 40a is in use.

Modified Example of First Embodiment

Figure 2:
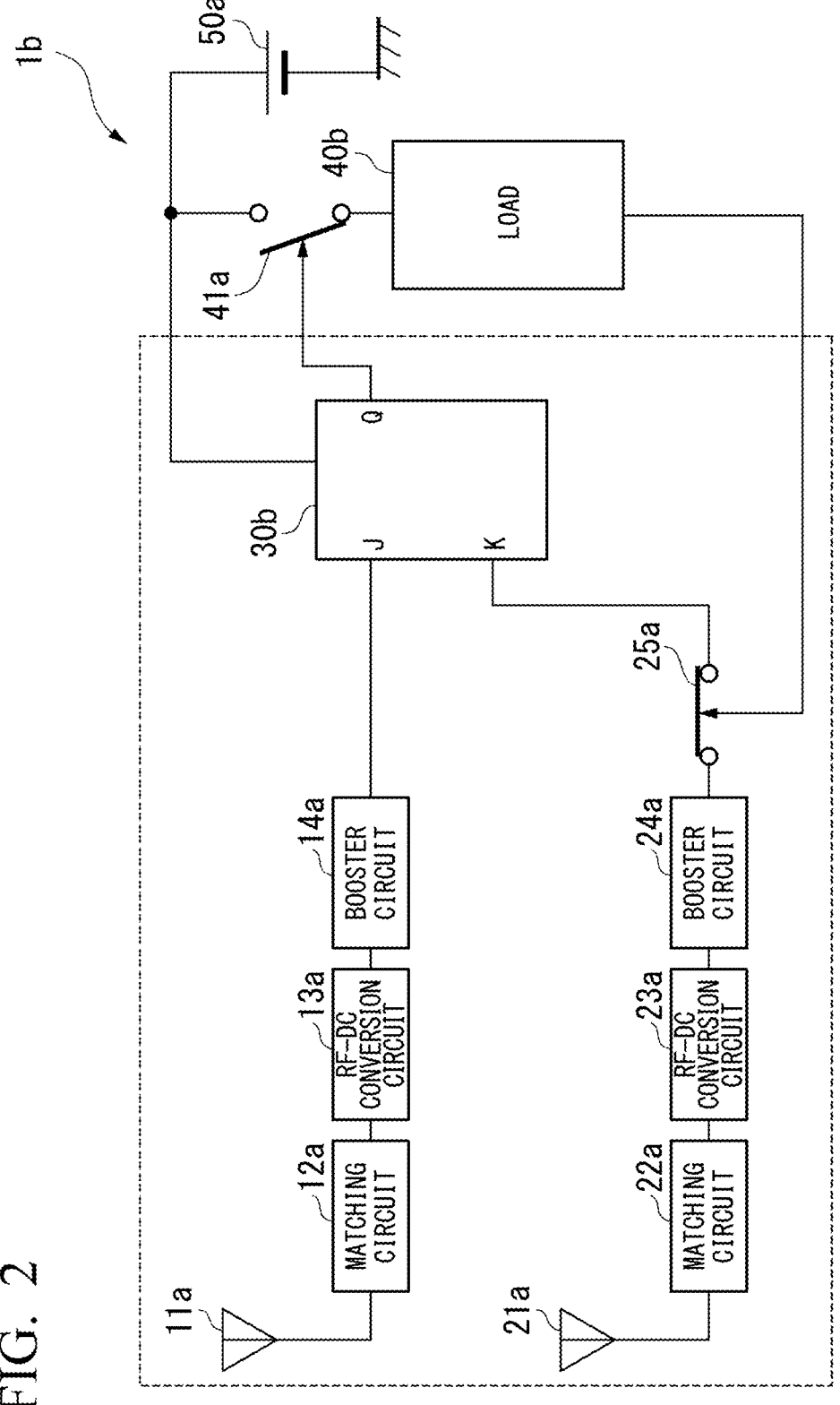
FIG. 2 is a diagram showing an example of an electronic circuit according to a modified example of the first embodiment.

An electronic circuit according to a modified example of the first embodiment will be described with reference to FIG. 2. In the description of the modified example of the first embodiment, the same components as in the above-described embodiment are indicated by the same reference numerals, and descriptions regarding content that overlaps with the above-described embodiment are omitted as appropriate. FIG. 2 is a diagram showing an example of the electronic circuit according to the modified example of the first embodiment. As shown in FIG. 2, an electronic circuit 1b includes the first antenna 11a, the matching circuit 12a, the RF-DC conversion circuit 13a, the booster circuit 14a, the second antenna 21a, the matching circuit 22a, the RF-DC conversion circuit 23a, the booster circuit 24a, the cutoff switch 25a, a control circuit 30b, a load 40b, the load switch 41a, and the power source 50a.

The control circuit 30b is, for example, a JK flip-flop. The control circuit 30b operates with power supplied from the power source 50a. The control circuit 30b includes a first input terminal, a second input terminal, and an output terminal. The first input terminal is connected to the booster circuit 14a, and receives first DC power. The second input terminal is connected to the booster circuit 24a, and receives second DC power. The output terminal turns the load switch 41a into a conductive state when the first DC power is input to the first input terminal. The output terminal turns the load switch 41a into a non-conductive state when the second DC power is input to the second input terminal.

Further, the output terminal maintains the current state of the load switch 41a when the first DC power input to the first input terminal is extremely weak and is therefore smaller than the predetermined first threshold value and the second DC power input to the second input terminal is extremely weak and is therefore smaller than the predetermined second threshold value. On the other hand, the output terminal inputs first DC power equal to or larger than the predetermined first threshold value to the first input terminal, inputs second DC power equal to or larger than the predetermined second threshold value to the second input terminal, and turns the load switch 41a into a non-conductive state when the load switch 41a is in a conductive state. Further, the output terminal inputs first DC power equal to or larger than the predetermined first threshold value to the first input terminal, inputs second DC power equal to or larger than the predetermined second threshold value to the second input terminal, and turns the load switch 41a into a conductive state when the load switch 41a is in a non-conductive state.

The load 40b is a circuit mounted to realize the functions of a device such as a small device equipped with the electronic circuit 1b. When the load switch 41a is in a conductive state, the load 40b operates by receiving power from the power source 50a. On the other hand, when the load switch 41b is in a non-conductive state, the load 40b does not receive power from the power source 50a, and therefore does not operate. The cutoff switch 25a is turned into a non-conductive state when or after starting the operation of the load 40b after the load switch 41a is in a conductive state. Accordingly, the load switch 41a is controlled to maintain a conductive state even when the second antenna 21a receives a second radio wave when the load switch is in a conductive state. Further, when the cutoff switch 25a is once turned into a non-conductive state based on the output from the load 40b, the cutoff switch can be turned into a conductive state again based on the output from the load 40b.

As described above, the electronic circuit 1b according to the modified example of the first embodiment has been described. The electronic circuit 1b is controlled so that the load switch 41a maintains a conductive state even when the second antenna 21a receives a second radio wave when the load switch 41a is in a conductive state. Accordingly, the electronic circuit 1b can prevent the load 40b from erroneously cutting off the supply of power from the power source 50a even when the second antenna 21a receives a second radio wave when the load 40b is in use.

Further, the electronic circuit 1*b* can once turn the cutoff switch 25*a* into a non-conductive state and then turn the cutoff switch 25*a* into a conductive state again based on the output from the load 40*b*.

Second Embodiment

Figure 3:
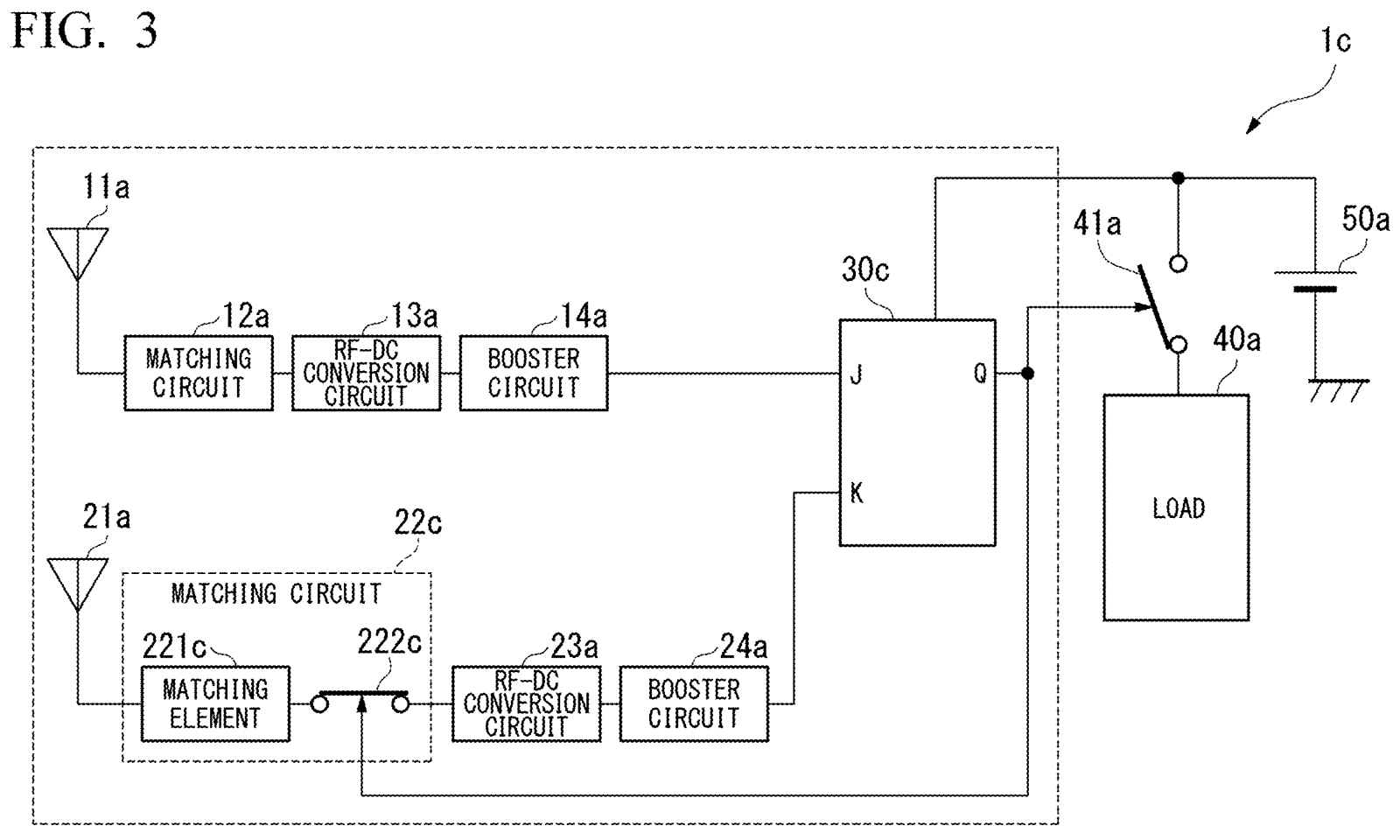

An electronic circuit according to a second embodiment will be described with reference to FIG. 3. In the description of the second embodiment, the same components as in the above-described embodiment or modified example are indicated by the same reference numerals, and descriptions regarding content that overlaps with the above-described embodiment or modified example are omitted as appropriate. FIG. 3 is a diagram showing an example of the electronic circuit according to the second embodiment. As shown in FIG. 3, an electronic circuit 1*c* includes the first antenna 11*a*, the matching circuit 12*a*, the RF-DC conversion circuit 13*a*, the booster circuit 14*a*, the second antenna 21*a*, a matching circuit 22*c*, the RF-DC conversion circuit 23*a*, the booster circuit 24*a*, a control circuit 30*c*, the load 40*a*, the load switch 41*a*, and the power source 50*a*.

The matching circuit 22*c*, the RF-DC conversion circuit 23*a*, and the booster circuit 24*a* constitute a second power conversion circuit that outputs second DC power based on second power. The matching circuit 22*c* includes a matching element 221*c* and a cutoff switch 222*c*. The matching element 221*c* and the cutoff switch 222*c* realize impedance matching between the second antenna 21*a* and the RF-DC conversion circuit 23*a*. The cutoff switch 222*c* is, for example, a field effect transistor (FET). Further, the cutoff switch 222*c* can switch from a conductive state to a non-conductive state based on the output from the control circuit 30*c*.

The control circuit 30*c* is, for example, a JK flip-flop. The control circuit 30*c* operates with power supplied from the power source 50*a*. The control circuit 30*c* includes a first input terminal, a second input terminal, and an output terminal.

The load switch 41*a* is controlled to maintain a conductive state even when the second antenna 21*a* receives a second radio wave in a conductive state. Specifically, the load switch 41*a* is controlled to maintain a conductive state in such a manner that the cutoff switch 222*c* provided in the path from the second antenna 21*a* to the second input terminal is turned into a non-conductive state based on the output from the output terminal. When the cutoff switch 222*c* is once turned into a non-conductive state based on the output from the output terminal, the cutoff switch cannot be a conductive state again based on the output from the output terminal.

As described above, the electronic circuit 1*c* according to the second embodiment has been described. The electronic circuit 1*c* is controlled so that the load switch 41*a* maintains a conductive state even when the second antenna 21*a* receives a second radio wave when the load switch 41*a* is in a conductive state. Accordingly, the electronic circuit 1*c* can prevent the load 40*a* from erroneously cutting off the supply of power from the power source 50*a* even when the second antenna 21*a* receives a second radio wave when the load 40*a* is in use. Further, in the electronic circuit 1*c*, since the cutoff switch 222*c* is an element that constitutes the matching circuit 22*c*, the cutoff switch 25*a* does not need to be provided. As a result, there is an advantage that the electronic circuit can be realized with a smaller number of parts.

Modified Example of Second Embodiment

Figure 4:
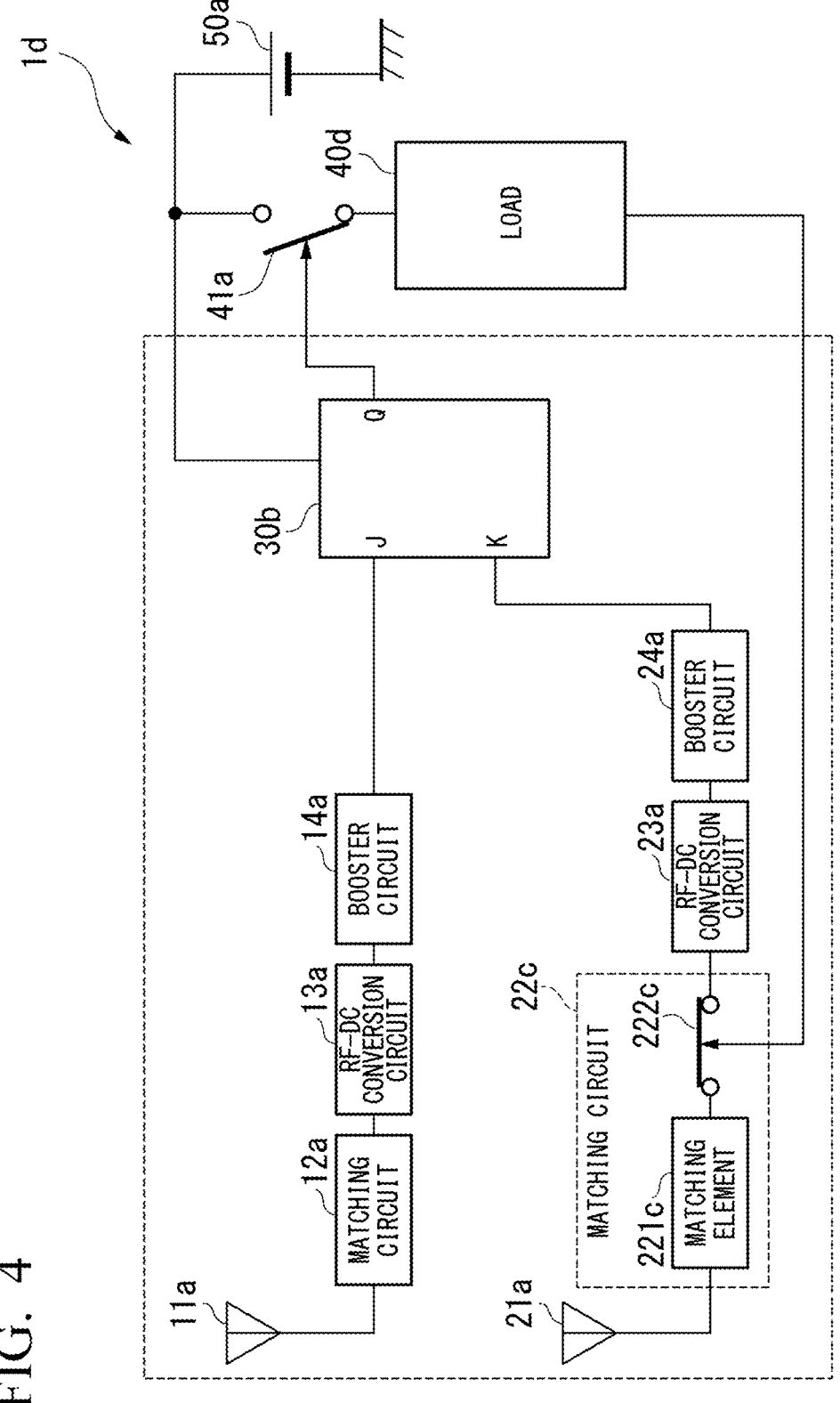
FIG. 4 is a diagram showing an example of an electronic circuit according to a modified example of the second embodiment.

An electronic circuit according to a modified example of the second embodiment will be described with reference to FIG. 4. In the description of the modified example of the second embodiment, the same components as in the above-described embodiment or modified example are indicated by the same reference numerals, and descriptions regarding content that overlaps with the above-described embodiment or modified example are omitted as appropriate. FIG. 4 is a diagram showing an example of the electronic circuit according to the modified example of the second embodiment. As shown in FIG. 4, an electronic circuit 1*d* includes the first antenna 11*a*, the matching circuit 12*a*, the RF-DC conversion circuit 13*a*, the booster circuit 14*a*, the second antenna 21*a*, the matching circuit 22*c*, the RF-DC conversion circuit 23*a*, the booster circuit 24*a*, the control circuit 30*b*, a load 40*d*, the load switch 41*a*, and the power source 50*a*.

The load 40*d* is a circuit mounted to realize the functions of a device such as a small device equipped with the electronic circuit 1*d*. When the load switch 41*a* is in a conductive state, the load 40*d* operates by receiving power from the power source 50*a*. On the other hand, when the load switch 41*a* is in a non-conductive state, the load 40*d* does not receive power from the power source 50*a*, and therefore does not operate. The cutoff switch 222*c* is turned into a non-conductive state when or after starting the operation of the load 40*d* after the load switch 41*a* is in a conductive state. Accordingly, the load switch 41*a* is controlled to maintain a conductive state even when the second antenna 21*a* receives a second radio wave when the load switch is in a conductive state. Further, when the cutoff switch 222*c* is once turned into a non-conductive state based on the output from the load 40*d*, the cutoff switch can be turned into a conductive state again based on the output from the load 40*d*.

As described above, the electronic circuit 1*d* according to the modified example of the second embodiment has been described. The electronic circuit 1*d* is controlled so that the load switch 41*a* maintains a conductive state even when the second antenna 21*a* receives a second radio wave when the load switch 41*a* is in a conductive state. Accordingly, the electronic circuit 1*d* can prevent the load 40*d* from erroneously cutting off the supply of power from the power source 50*a* even when the second antenna 21*a* receives a second radio wave when the load 40*d* is in use. Further, in the electronic circuit 1*d*, since the cutoff switch 222*c* is an element that constitutes the matching circuit 22*c*, the cutoff switch 25*a* does not need to be provided. As a result, there is an advantage that the electronic circuit can be realized with a smaller number of parts. Furthermore, the electronic circuit 1*d* can turn the cutoff switch 25*a* which is in a non-conductive state into a conductive state again based on the output of the load 40*d*.

Third Embodiment

Figure 5:
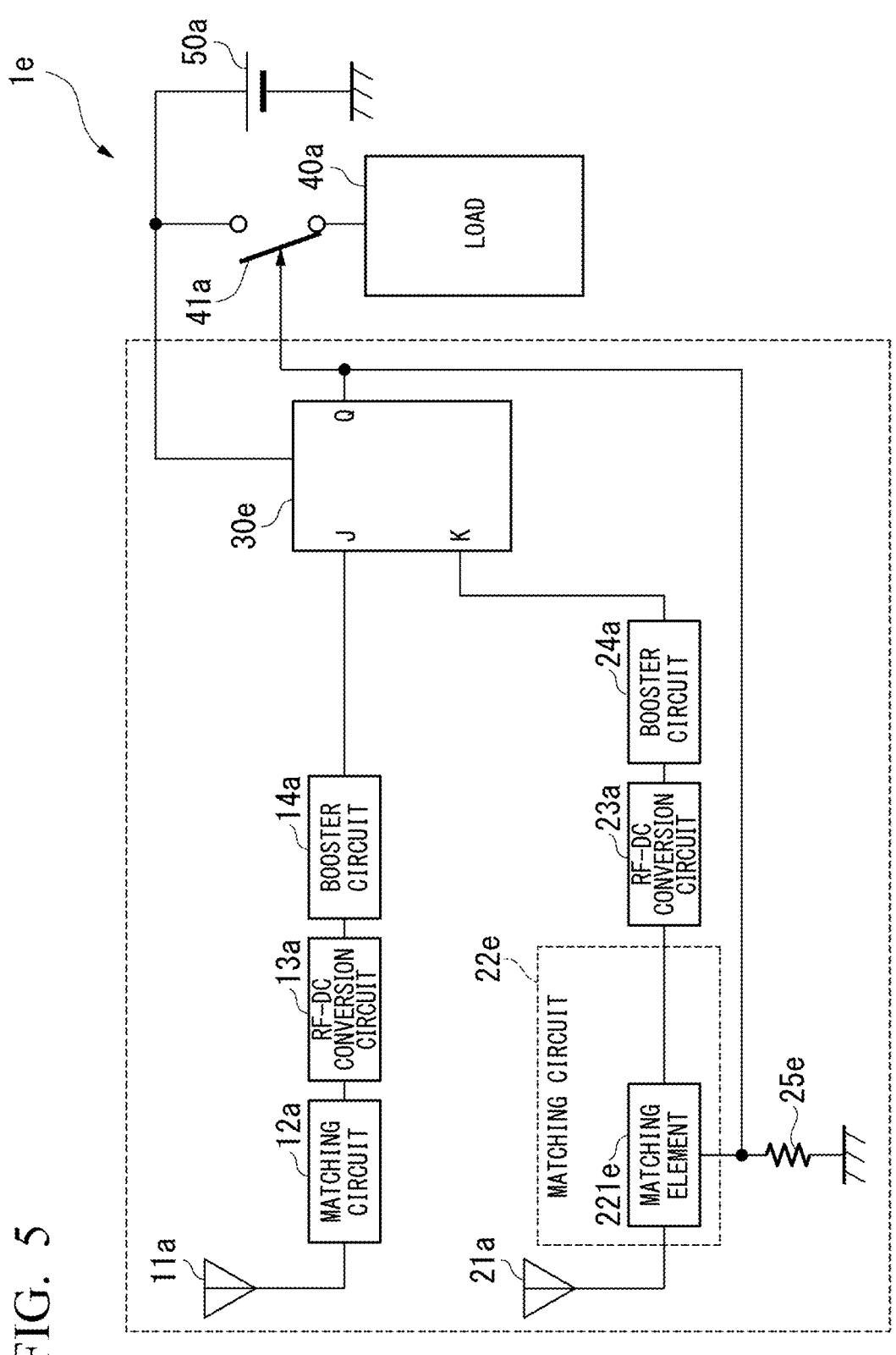
FIG. 5 is a diagram showing an example of an electronic circuit according to a third embodiment.

An electronic circuit according to a third embodiment will be described with reference to FIG. 5. In the description of the third embodiment, the same components as in the above-described embodiment or modified example are indicated by the same reference numerals, and descriptions regarding content that overlaps with the above-described embodiment or modified example are omitted as appropriate. FIG. 5 is a diagram showing an example of the electronic circuit according to the third embodiment. As shown in FIG. 5, an electronic circuit 1*e* includes the first antenna 11*a*, the matching circuit 12*a*, the RF-DC conversion circuit 13*a*, the booster circuit 14*a*, the second antenna 21*a*, a matching circuit 22*e*, the RF-DC conversion circuit 23*a*, the booster circuit 24a, a resistor 25e, a control circuit 30e, the load 40a, the load switch 41a, and the power source 50a.

The matching circuit 22e, the RF-DC conversion circuit 23a, and the booster circuit 24a constitute a second power conversion circuit that outputs second DC power based on second power. The matching circuit 22e includes a matching element 221e. The matching element 221e realizes impedance matching between the second antenna 21a and the RF-DC conversion circuit 23a. Further, the matching element 221e is connected to the grounded resistor 25e. The matching constant of the matching circuit 22e changes depending on the potential difference between both ends of the resistor 25e.

The control circuit 30e is, for example, a JK flip-flop. The control circuit 30e operates with power supplied from the power source 50a. The control circuit 30e includes a first input terminal, a second input terminal, and an output terminal.

The load switch 41a is controlled to maintain a conductive state even when the second antenna 21a receives a second radio wave in a conductive state. Specifically, in the load switch 41a, the output from the output terminal is introduced into the resistor 25e to generate a potential difference, the matching constant of the matching circuit 22e is changed not to realize impedance matching, and second power is not transmitted to the RF-DC conversion circuit 23a to maintain a conductive state.

As described above, the electronic circuit 1e according to the third embodiment has been described. The electronic circuit 1e is controlled so that the load switch 41a maintains a conductive state even when the second antenna 21a receives a second radio wave when the load switch 41a is in a conductive state. Accordingly, the electronic circuit 1e can prevent the load 40a from erroneously cutting off the supply of power from the power source 50a even when the second antenna 21a receives a second radio wave when the load 40a is in use.

Modified Example of Third Embodiment

Figure 6:
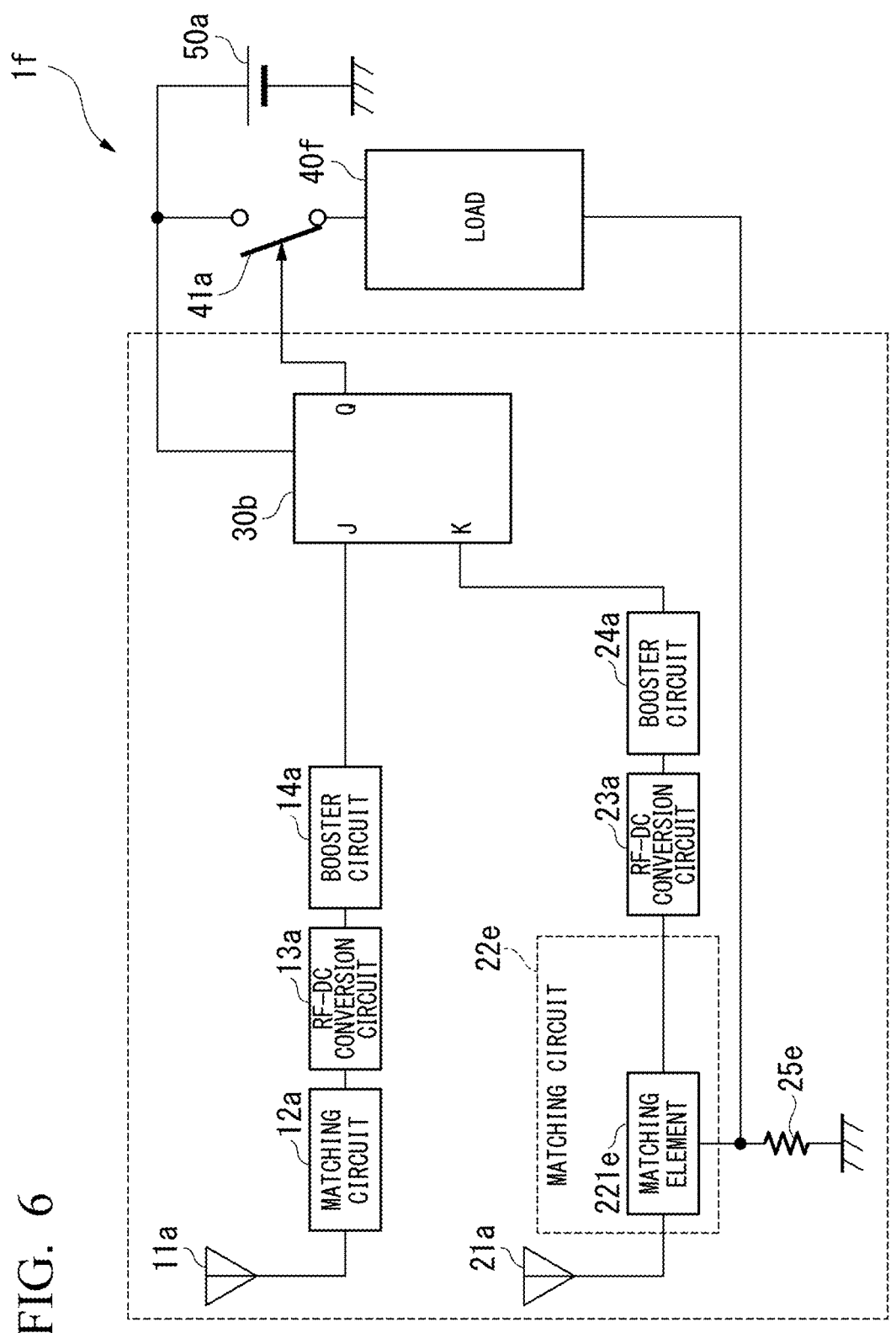
FIG. 6 is a diagram showing an example of an electronic circuit according to a modified example of the third embodiment.

An electronic circuit according to a modified example of the third embodiment will be described with reference to FIG. 6. In the description of the modified example of the third embodiment, the same components as in the above-described embodiment or modified example are indicated by the same reference numerals, and descriptions regarding content that overlaps with the above-described embodiment or modified example are omitted as appropriate. FIG. 6 is a diagram showing an example of the electronic circuit according to the modified example of the third embodiment. As shown in FIG. 6, an electronic circuit 1f includes the first antenna 11a, the matching circuit 12a, the RF-DC conversion circuit 13a, the booster circuit 14a, the second antenna 21a, the matching circuit 22e, the RF-DC conversion circuit 23a, the booster circuit 24a, the resistor 25e, the control circuit 30b, a load 40f, the load switch 41a, and the power source 50a.

The load 40f is a circuit mounted to realize the functions of a device such as a small device equipped with the electronic circuit 1f. When the load switch 41a is in a conductive state, the load 40f operates by receiving power from the power source 50a. On the other hand, when the load switch 41a is in a non-conductive state, the load 40f does not receive power from the power source 50a, and therefore does not operate. The load 40f introduces its own output to the resistor 25e when or after starting the operation of the load after the load switch 41a is turned into a conductive state. Accordingly, the load switch 41a is controlled to maintain a conductive state even when the second antenna 21a receives a second radio wave in a conductive state. Further, even when the matching circuit 22e once cannot realize impedance matching based on the output from the load 40f, the impedance matching can be realized again by stopping the introduction of the output from the load 40f.

As described above, the electronic circuit 1f according to the modified example of the third embodiment has been described. The electronic circuit 1f is controlled so that the load switch 41a maintains a conductive state even when the second antenna 21a receives a second radio wave when the load switch 41a is in a conductive state. Accordingly, the electronic circuit 1f can prevent the load 40f from erroneously cutting off the supply of power from the power source 50a even when the second antenna 21a receives a second radio wave when the load 40f is in use. Further, the electronic circuit 1f can allow the matching circuit 22e to realize impedance matching based on the output of the load 40f again even when the matching circuit 22e cannot realize the impedance matching.

Fourth Embodiment

Figure 7:
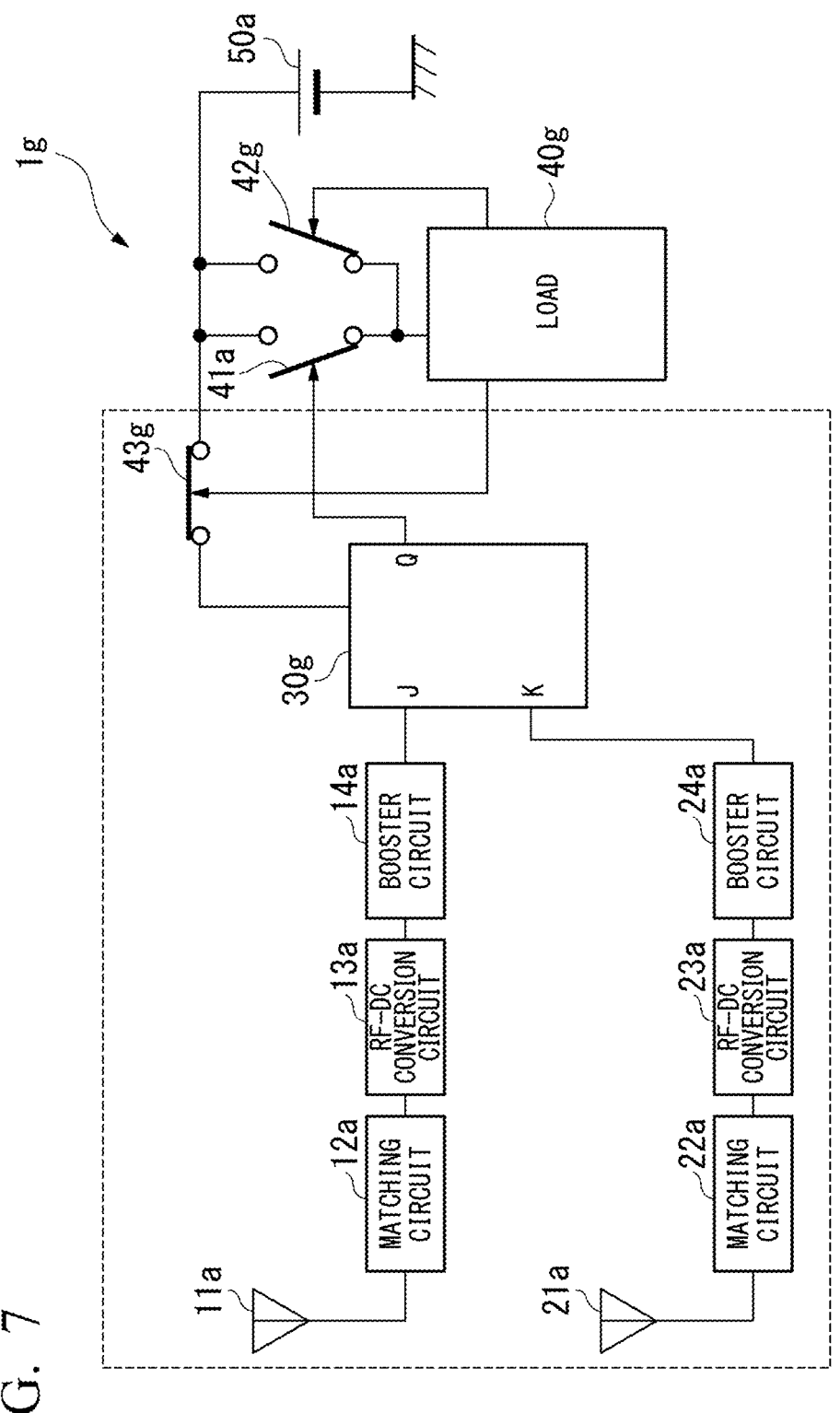
FIG. 7 is a diagram showing an example of an electronic circuit according to a fourth embodiment.

An electronic circuit according to a fourth embodiment will be described with reference to FIG. 7. In the description of the fourth embodiment, the same components as in the above-described embodiment or modified example are indicated by the same reference numerals, and descriptions regarding content that overlaps with the above-described embodiment or modified example are omitted as appropriate. FIG. 7 is a diagram showing an example of the electronic circuit according to the fourth embodiment. As shown in FIG. 7, an electronic circuit 1g includes the first antenna 11a, the matching circuit 12a, the RF-DC conversion circuit 13a, the booster circuit 14a, a second antenna 21g, a matching circuit 22g, an RF-DC conversion circuit 23g, a booster circuit 24g, a control circuit 30g, a load 40g, the load switch 41a, a load switch 42g, the control circuit switch 43a, and the power source 50a.

The control circuit 30g is, for example, a JK flip-flop. The control circuit 30g operates with power supplied from the power source 50a. The control circuit 30g includes a first input terminal, a second input terminal, and an output terminal.

The load 40g is a circuit mounted to realize the functions of a device such as a small device equipped with the electronic circuit 1g. In the load 40g, the load switch 42g is turned into a conductive state after the control circuit 30g turns the load switch 41a into a conductive state. The load 40g operates by receiving power from the power source 50a via at least one of the load switch 41a and the load switch 42g. On the other hand, when the load switch 41a and the load switch 42g are in a non-conductive state, the load 40g does not receive power from the power source 50a, and therefore does not operate.

If the second antenna 21g receives a second radio wave when the load switch 41a is in a conductive state, the load switch is turned into a non-conductive state. As a result, there is a risk that the power supply to the load 40g will be cut off. In order to avoid this situation, the load switch 42g is turned into a conductive state. Further, even when the load switch 41a is turned into a non-conductive state by turning the control circuit switch 43g into a non-conductive state and cutting off the power supply to the control circuit 30g in order to avoid the influence of the second radio wave, the load 40g can continue operating since the load switch 42g is in a conductive state.

Further, the control circuit switch 43g can be turned into a conductive state again based on the output from the load 40g after the path once becomes a non-conductive state based on the output from the load 40g. Then, in this case, the load switch 41a can be controlled to be in a conductive state or a non-conductive state again by the control circuit 30g that operates by receiving power from the power source 50a via the control circuit switch 43g.

As described above, the electronic circuit 1g according to the fourth embodiment has been described. The electronic circuit 1g continues to operate the load 40g by turning the load switch 42g into a conductive state even when the load switch 41a is in a non-conductive state. Accordingly, the electronic circuit 1g can prevent the load 40g from erroneously cutting off the supply of power from the power source 50a even when the second antenna 21g receives a second radio wave when the load 40g is in use.

Fifth Embodiment

Figure 8:
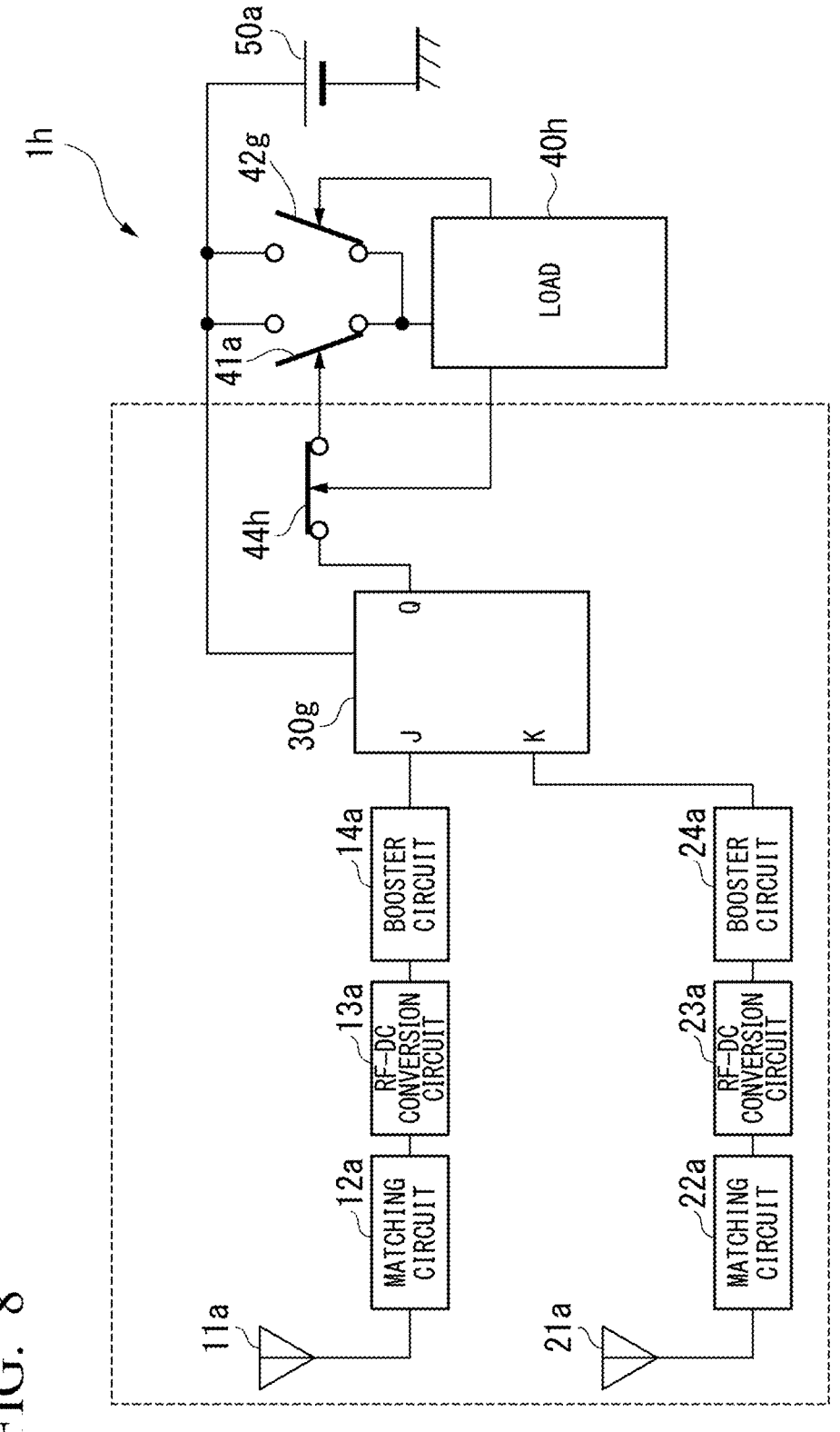
FIG. 8 is a diagram showing an example of an electronic circuit according to a fifth embodiment.

An electronic circuit according to a fifth embodiment will be described with reference to FIG. 8. In the description of the fifth embodiment, the same components as in the above-described embodiment or modified example are indicated by the same reference numerals, and descriptions regarding content that overlaps with the above-described embodiment or modified example are omitted as appropriate. FIG. 8 is a diagram showing an example of the electronic circuit according to the fifth embodiment. As shown in FIG. 8, an electronic circuit 1h includes the first antenna 11a, the matching circuit 12a, the RF-DC conversion circuit 13a, the booster circuit 14a, the second antenna 21a, the matching circuit 22a, the RF-DC conversion circuit 23a, the booster circuit 24a, the control circuit 30g, a load 40h, the load switch 41a, the load switch 42g, a control switch 44h, and the power source 50a.

The load 40h is a circuit mounted to realize the functions of a device such as a small device equipped with the electronic circuit 1h. In the load 40h, the load switch 42g is turned into a conductive state after the control circuit 30g turns the load switch 41a into a conductive state. The load 40h operates by receiving power from the power source 50a via at least one of the load switch 41a and the load switch 42g. On the other hand, when the load switch 41a and the load switch 42g are in a non-conductive state, the load 40h does not receive power from the power source 50a, and therefore does not operate.

If the second antenna 21a receives a second radio wave when the load switch 41a is in a conductive state, the load switch is turned into a non-conductive state. As a result, there is a risk that the power supply to the load 40h will be cut off. In order to avoid this situation, the load switch 42g is turned into a conductive state. Further, even when the load switch 41a is turned into a non-conductive state by turning the control switch 44h into a non-conductive state in order to avoid the influence of the second radio wave, the load 40h can continue operating since the load switch 42g is in a conductive state.

Further, the control switch 44h can be turned into a conductive state again based on the output from the load 40h after the path from the control circuit 30h to the load switch 41a becomes a non-conductive state based on the output from the load 40h. Then, in this case, the load switch 41a can be controlled to be in a conductive state or a non-conductive state again by the control circuit 30g that operates by receiving power from the power source 50a via the control switch 44h.

As described above, the electronic circuit 1h according to the fifth embodiment has been described. The electronic circuit 1h continues to operate the load 40h by turning the load switch 42g into a conductive state even when the load switch 41a is in a non-conductive state. Accordingly, the electronic circuit 1h can prevent the load 40h from erroneously cutting off the supply of power from the power source 50a even when the second antenna 21a receives a second radio wave when the load 40h is in use.

Sixth Embodiment

Figure 9:
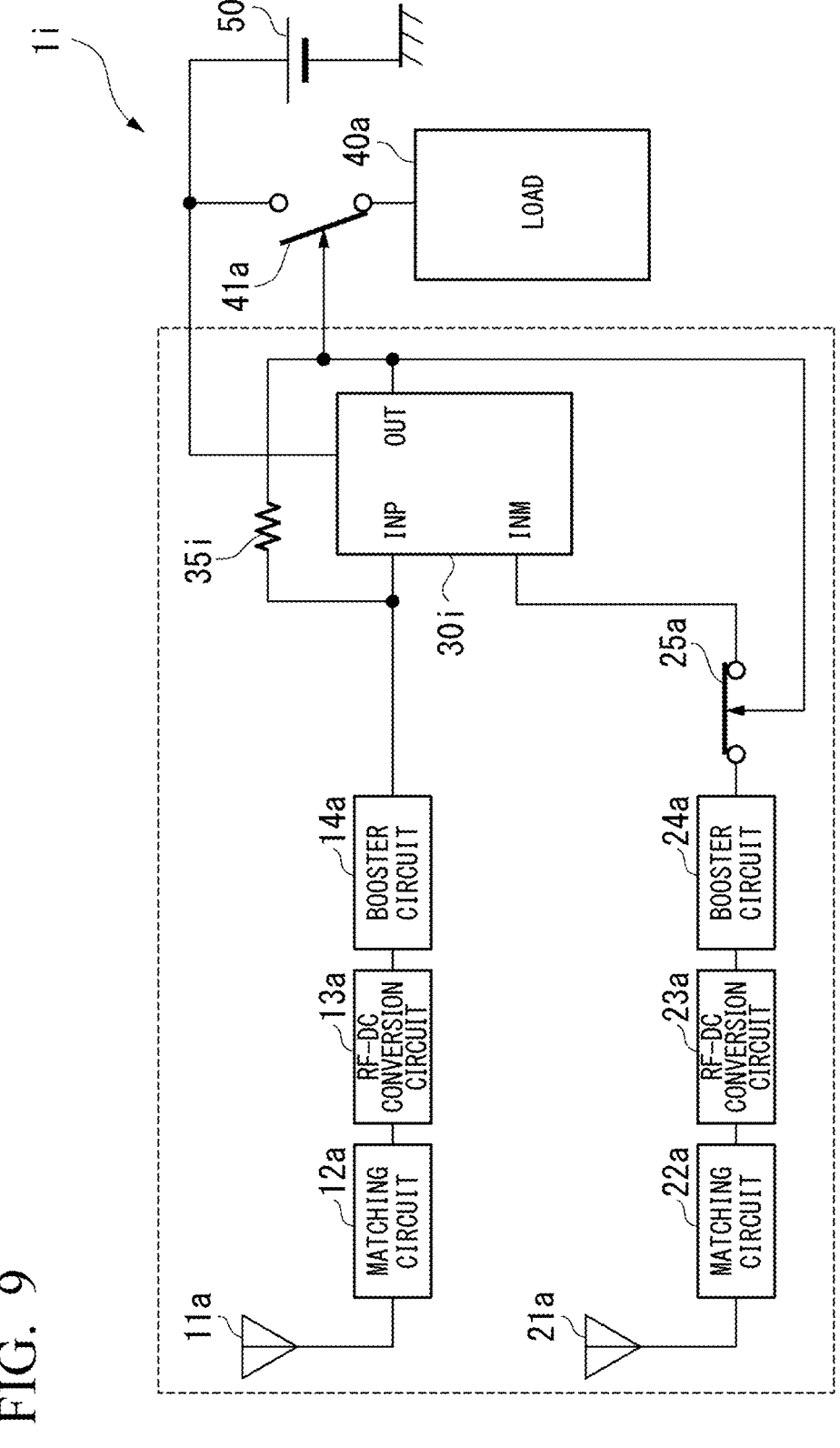
FIG. 9 is a diagram showing an example of an electronic circuit according to a sixth embodiment.

An electronic circuit according to a sixth embodiment will be described with reference to FIG. 9. In the description of the sixth embodiment, the same components as in the above-described embodiment or modified example are indicated by the same reference numerals, and descriptions regarding content that overlaps with the above-described embodiment or modified example are omitted as appropriate. FIG. 9 is a diagram showing an example of the electronic circuit according to the sixth embodiment. As shown in FIG. 9, an electronic circuit 1i includes the first antenna 11a, the matching circuit 12a, the RF-DC conversion circuit 13a, the booster circuit 14a, the second antenna 21a, the matching circuit 22a, the RF-DC conversion circuit 23a, the booster circuit 24a, the cutoff switch 25a, a control circuit 30i, a resistor 35i, the load 40a, the load switch 41a, and the power source 50a.

The control circuit 30i is, for example, an ultra-low current consumption weak signal detector. The power required for the operation of the ultra-low current consumption weak signal detector is at the nanoampere (nA) level, which is so small that there is no need to consider the lifespan of the power source 50a. The control circuit 30i includes a first input terminal, a second input terminal, and an output terminal. The resistor 35i has the role of maintaining a conductive state by feeding back the signal output from the output terminal to the first input terminal.

The load switch 41a is controlled to maintain a conductive state even when the second antenna 21a receives a second radio wave in a conductive state. Specifically, the load switch 41a is controlled to maintain a conductive state in such a manner that the cutoff switch 25a provided in the path from the second antenna 21a to the second input terminal is turned into a non-conductive state based on the output from the output terminal. Further, when the cutoff switch 25a is once turned into a non-conductive state based on the output from the output terminal, the cutoff switch cannot be a conductive state again based on the output from the output terminal.

As described above, the electronic circuit 1i according to the sixth embodiment has been described. The electronic circuit 1i is controlled so that the load switch 41a maintains a conductive state even when the second antenna 21a receives a second radio wave when the load switch 41a is in a conductive state. Accordingly, the electronic circuit 1i can prevent the load 40a from erroneously cutting off the supply of power from the power source 50a even when the second antenna 21a receives a second radio wave when the load 40a is in use. Further, since the control circuit 30i is an ultra-low current consumption weak signal detector, the electronic circuit 1i can achieve the effect with less power.

Modified Example of Sixth Embodiment

Figure 10:
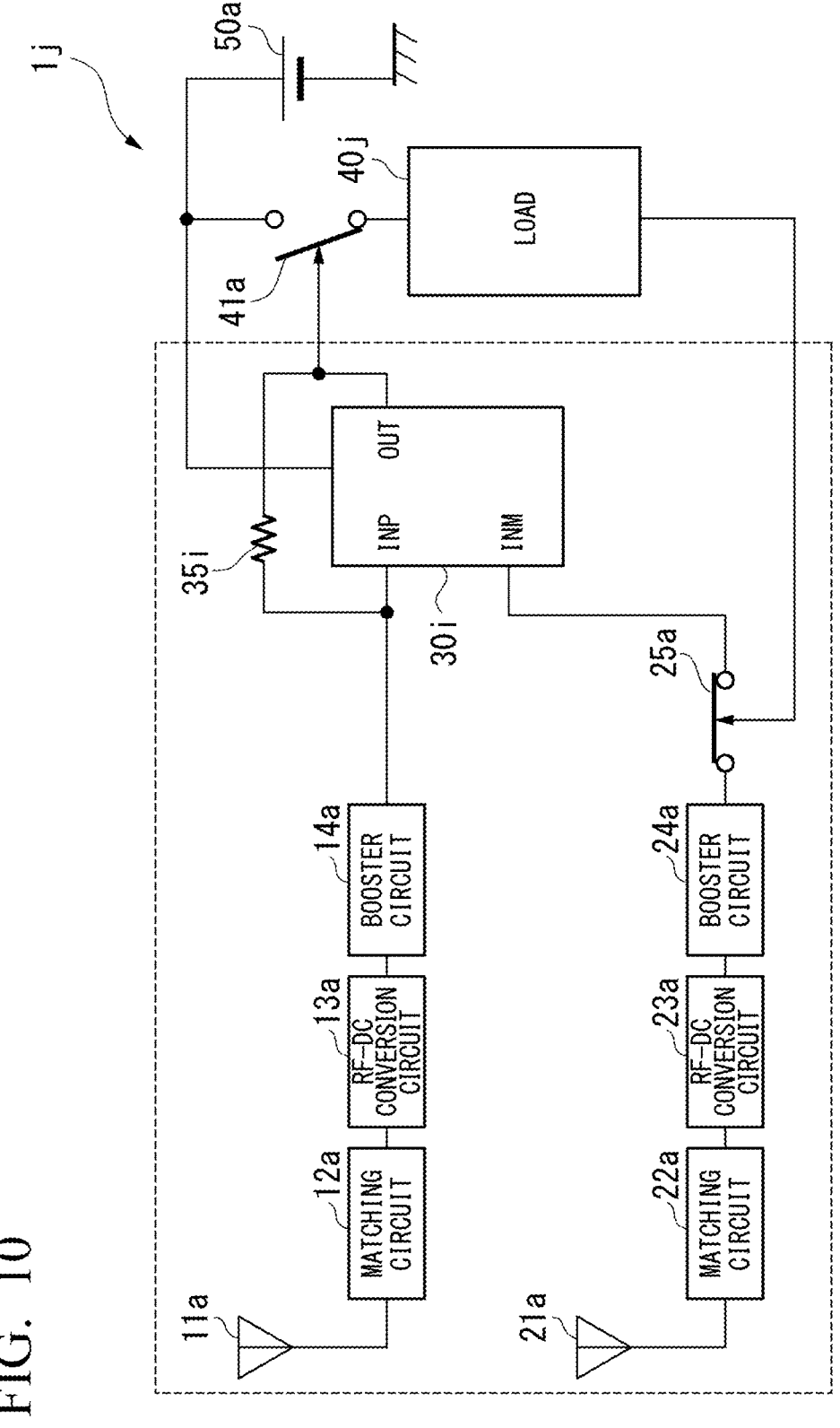
FIG. 10 is a diagram showing an example of an electronic circuit according to a modified example of the sixth embodiment.

An electronic circuit according to a modified example of the sixth embodiment will be described with reference to FIG. 10. In the description of the modified example of the sixth embodiment, the same components as in the above-described embodiment or modified example are indicated by the same reference numerals, and descriptions regarding content that overlaps with the above-described embodiment or modified example are omitted as appropriate. FIG. 10 is a diagram showing an example of the electronic circuit according to the modified example of the sixth embodiment. As shown in FIG. 10, an electronic circuit 1*j* includes the first antenna 11*a*, the matching circuit 12*a*, the RF-DC conversion circuit 13*a*, the booster circuit 14*a*, the second antenna 21*a*, the matching circuit 22*a*, the RF-DC conversion circuit 23*a*, the booster circuit 24*a*, the cutoff switch 25*a*, the control circuit 30*i*, the resistor 35*i*, a load 40*j*, the load switch 41*a*, and the power source 50*a*.

The load 40*j* is a circuit mounted to realize the functions of a device such as a small device equipped with the electronic circuit 1*j*. When the load switch 41*a* is in a conductive state, the load 40*j* operates by receiving power from the power source 50*a*. On the other hand, when the load switch 41*a* is in a non-conductive state, the load 40*j* does not receive power from the power source 50*a*, and therefore does not operate.

The load switch 41*a* is controlled to maintain a conductive state even when the second antenna 21*a* receives a second radio wave in a conductive state. Specifically, the load switch 41*a* is controlled to maintain a conductive state in such a manner that the cutoff switch 25*a* provided in the path from the second antenna 21*a* to the second input terminal is turned into a non-conductive state based on the output from the load 40*j*. Further, when the cutoff switch 25*a* is once turned into a non-conductive state based on the output from the load 40*j*, the cutoff switch can be turned into a conductive state again based on the output from the load 40*j*.

As described above, the electronic circuit 1*j* according to the modified example of the sixth embodiment has been described. The electronic circuit 1*j* is controlled so that the load switch 41*a* maintains a conductive state even when the second antenna 21*a* receives a second radio wave when the load switch 41*a* is in a conductive state. Accordingly, the electronic circuit 1*j* can prevent the load 40*j* from erroneously cutting off the supply of power from the power source 50*a* even when the second antenna 21*a* receives a second radio wave when the load 40*j* is in use. Further, since the control circuit 30*i* is an ultra-low current consumption weak signal detector, the electronic circuit 1*j* can achieve the effect with less power.

Seventh Embodiment

Figure 11:
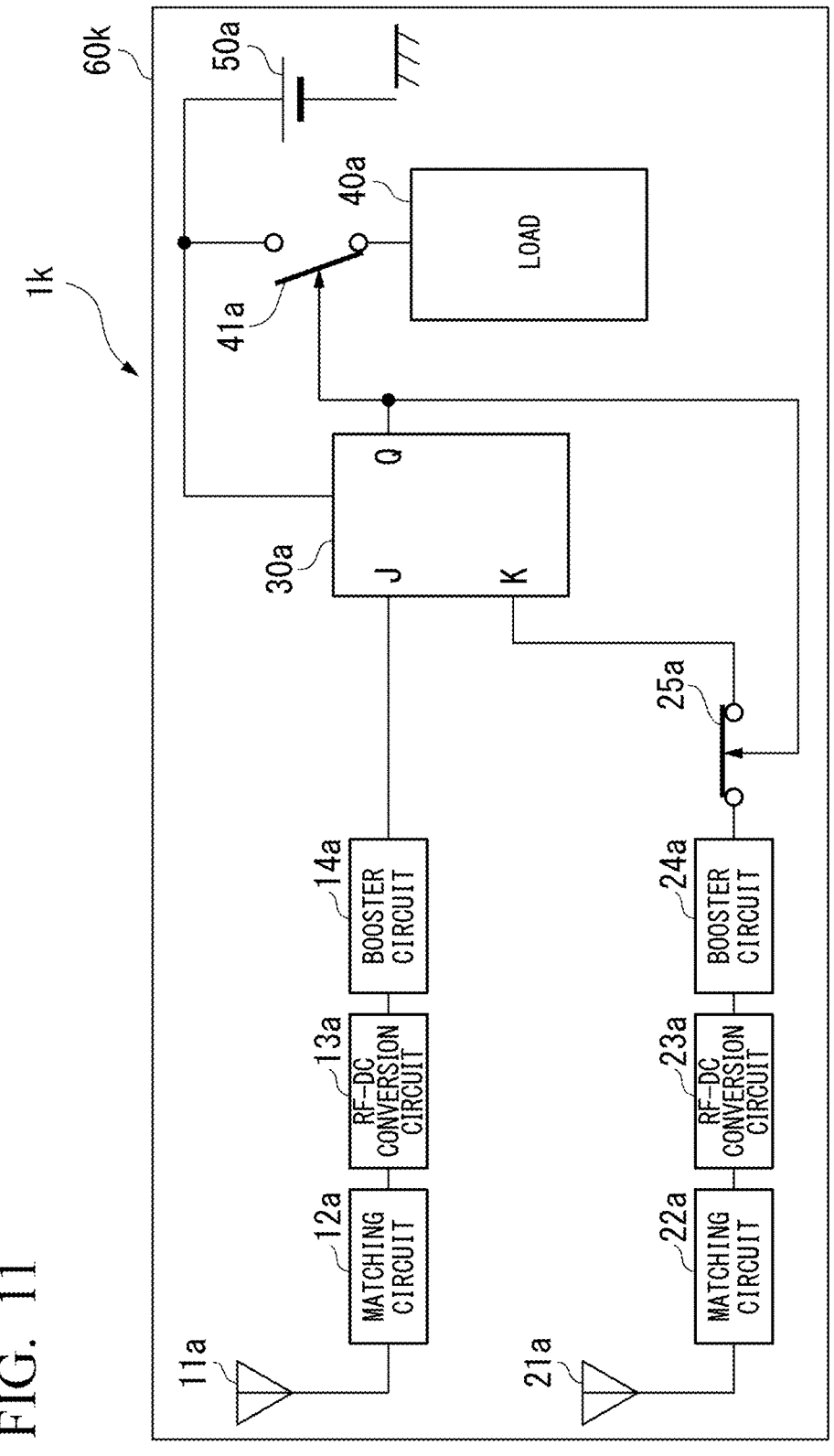
FIG. 11 is a diagram showing an example of an electronic circuit according to a seventh embodiment.

An electronic circuit according to a seventh embodiment will be described with reference to FIG. 11. FIG. 11 is a diagram showing an example of the electronic circuit according to the seventh embodiment. As shown in FIG. 11, the electronic circuit 1*k* is a module including the first antenna 11*a*, the matching circuit 12*a*, the RF-DC conversion circuit 13*a*, the booster circuit 14*a*, the second antenna 21*a*, the matching circuit 22*a*, the RF-DC conversion circuit 23*a*, the booster circuit 24*a*, the cutoff switch 25*a*, the control circuit 30*a*, the load 40*a*, the load switch 41*a*, the power source 50*a*, and a waterproof structure 60*k*. The electronic circuit 1*k* is the same as the electronic circuit 1*a* according to the first embodiment except that the waterproof structure 60*k* is provided. The waterproof structure 60*k* is, for example, a resin that covers the entire electronic circuit 1*a* without any gaps.

As described above, the electronic circuit 1*k* according to the seventh embodiment has been described. Since the electronic circuit 1*k* includes the waterproof structure 60*k*, it is possible to obtain the same effect as the electronic circuit 1*a* according to the first embodiment while avoiding problems caused by moisture intrusion.

Furthermore, in the embodiment or modified example described above, although the case where the control circuit 30*a*, the control circuit 30*b*, the control circuit 30*c*, the control circuit 30*e*, and the control circuit 30*g* are JK flip-flops has been described as an example, the present invention is not limited thereto. At least one of the control circuit 30*a*, the control circuit 30*b*, the control circuit 30*c*, the control circuit 30*e*, and the control circuit 30*g* may be another type of flip-flop, for example, an RS flip-flop or an ultra-low current consumption weak signal detector.

Further, the electronic circuit according to the embodiment described above may be configured as a module including a power source that outputs DC power.

Further, the electronic circuit according to the embodiment described above may be combined with a transmitter that transmits predetermined radio waves to configure a system. The predetermined radio waves referred to here are, for example, the above-described first radio waves and second radio waves.

Figure 12:
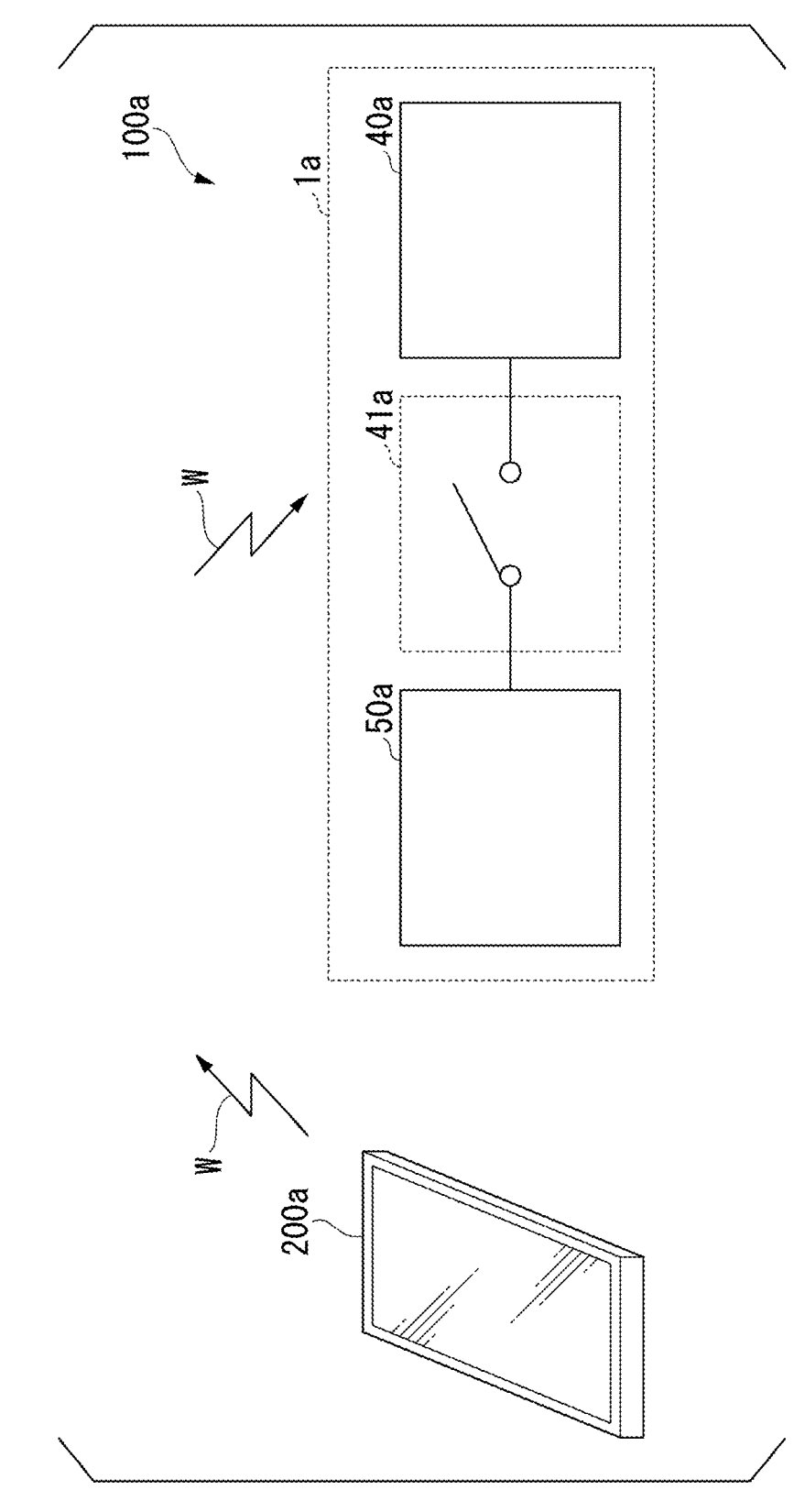
FIG. 12 is a diagram showing an example of a system including an electronic circuit according to the first embodiment.

FIG. 12 is a diagram showing an example of a system including the electronic circuit according to the first embodiment. A system 100*a* includes the electronic circuit 1*a* and a transmitter 200*a*. The transmitter 200*a* is a mobile information processing terminal capable of performing wireless communication such as a multifunctional mobile phone terminal (smartphone), a mobile phone terminal, a PDA (Personal Digital Assistant), a notebook PC, and a tablet PC. The transmitter 70 is not limited to a mobile information processing terminal, and may be another information processing terminal. The transmitter 200*a* transmits, for example, the radio wave W to the electronic circuit 1*a* as the first radio wave or the second radio wave. The radio wave W is a radio wave emitted by a transmitting device during wireless communication performed by communication standards such as Bluetooth (registered trademark) and Wi-Fi (registered trademark). However, the radio wave W is not limited to communication standards such as Bluetooth (registered trademark) and Wi-Fi (registered trademark), can employ various communication methods, and may be communication based on a unique standard that does not apply to the predetermined communication standards.

As described above, the embodiments of the present invention have been described with reference to the drawings. However, the electronic circuit is not limited to the embodiments described above, and at least one of various modifications, substitutions, combinations, and design changes can be made without departing from the gist of the present invention.

Further, the effects of the embodiments of the present invention described above are the effects described as an example. Therefore, the embodiments of the present invention may have other effects other than those described above that can be recognized by those skilled in the art from the description of the embodiments described above.

INDUSTRIAL APPLICABILITY

According to the present invention, it is possible to prevent erroneously cutting off the power source and the electronic circuit when the small device is in use.

15

What is claimed is:

1. An electronic circuit comprising:

a load that is driven by power supplied from a power source;

a load switch that is connected between the power source and the load and switches a connection state between the power source and the load to any one of a conductive state of supplying power from the power source to the load and a non-conductive state of cutting off power supplied from the power source to the load;

a first power conversion circuit that outputs first DC power based on first power obtained by a first radio wave received by a first antenna;

a second power conversion circuit that outputs second DC power based on second power obtained by a second radio wave received by a second antenna; and a control circuit that has a first input terminal connected to the first power conversion circuit, a second input terminal connected to the second power conversion circuit, and an output terminal of turning the load switch into a conductive state when the first DC power is input to the first input terminal and turning the load switch into a non-conductive state when the second DC power is input to the second input terminal, wherein:

the load switch is controlled to maintain a conductive state even when the second antenna receives the second radio wave in a conductive state, and the load switch is controlled to maintain a conductive state by cutting off a path from the second antenna to the second input terminal based on an output from the output terminal or an output from the load.

2. The electronic circuit according to claim 1, wherein the load switch is controlled to maintain a conductive state in such a manner that a cutoff switch provided in the path turns the path into a non-conductive state based on the output from the output terminal or the output from the load.

3. The electronic circuit according to claim 2, wherein the cutoff switch constitutes a matching circuit provided in the path.

4. The electronic circuit according to claim 1, wherein the load switch is controlled to maintain a conductive state in such a manner that the output from the output terminal or the output from the load is introduced into a resistor connected to a matching circuit provided in the path to change a matching constant of the matching circuit.

5. The electronic circuit according to claim 1, wherein at least two load switches are provided, wherein the control circuit is driven by DC power supplied from the power source, and wherein at least one load switch is controlled so that the load switch maintains a conductive state even when a path from the power source to the control circuit is cut off based on an output from the load.

6. The electronic circuit according to claim 1, wherein at least two load switches are provided, wherein the control circuit is driven by DC power supplied from the power source, and wherein at least one load switch is controlled so that the load switch maintains a conductive state even when a path from the control circuit to the load switch is cut off based on an output from the load.

7. The electronic circuit according to claim 1, wherein the control circuit is a flip-flop or an ultra-low current consumption weak signal detector.

8. A module comprising:

the electronic circuit according to claim 1; and a power source that outputs DC power.

9. The module according to claim 8, wherein the electronic circuit and the power source are accommodated in a casing having a waterproof function.

10. A system comprising:

the module according to claim 8; and a transmitter that transmits predetermined radio waves to the module.

* * * * *